Aug. 25, 1964  W. A. HALLAM  3,145,984
SINGLE TAPER LEAF SPRING
Filed July 5, 1962
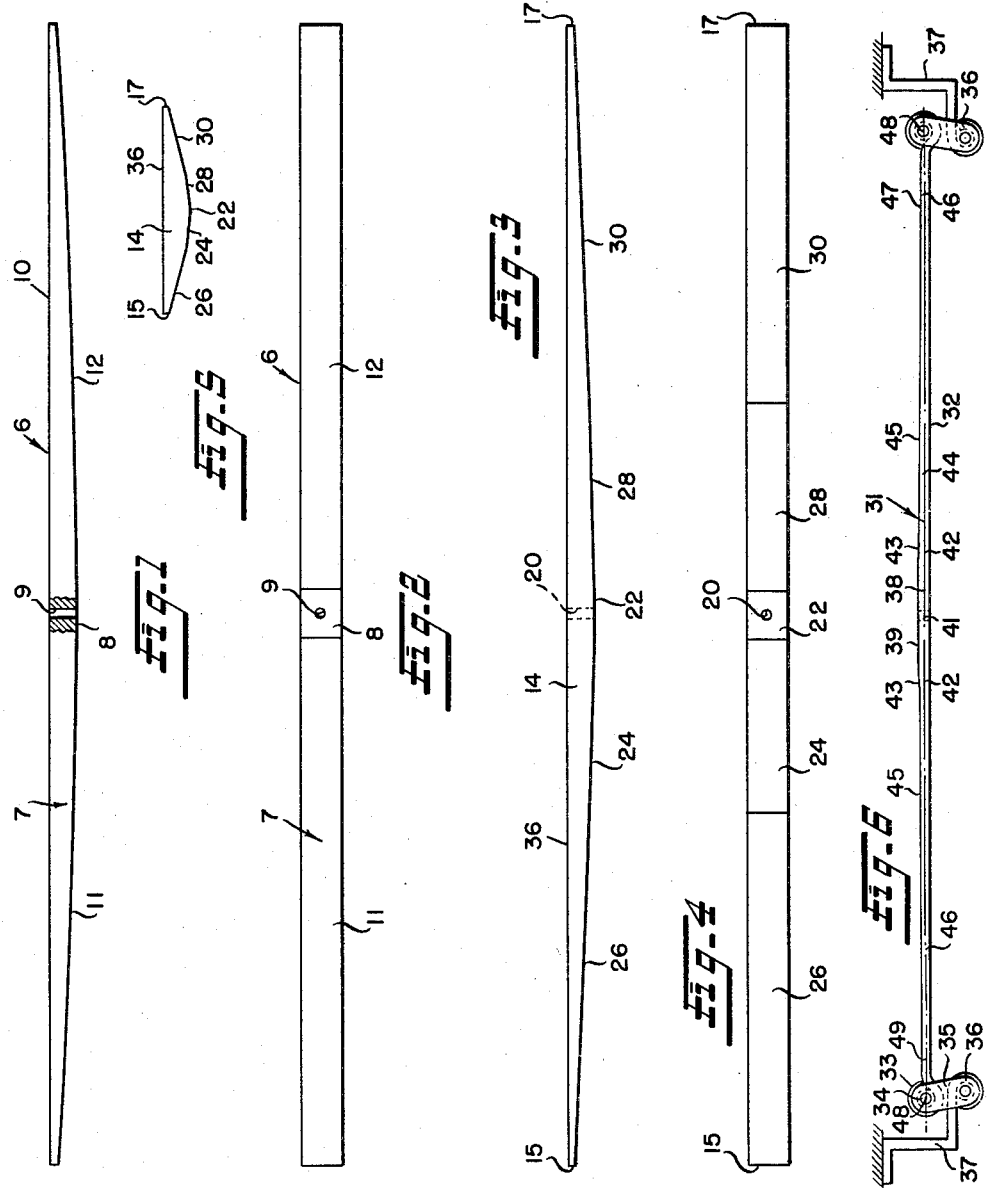
INVENTOR
William A. Hallam

United States Patent Office 3,145,984
Patented Aug. 25, 1964

3,145,984
SINGLE TAPER LEAF SPRING
William A. Hallam, Gary, Ind., assignor to Rockwell-Standard Corporation, Coraopolis, Pa., a corporation of Pennsylvania
Filed July 5, 1962, Ser. No. 207,553
9 Claims. (Cl. 267—47)

This invention relates to improvements in vehicle springs and has particular reference to a single tapered leaf spring. This is a continuation-in-part of my co-pending application Serial No. 653,425 filed April 17, 1957, now Patent Number 3,053,527, for Leaf Spring Assemblies.

Vehicle riding conditions, particularly important where passengers are involved, are improved by the ability of springs to absorb road shocks, and the lower the absolute spring rate (pounds per inch of deflection) the more work the spring does in absorbing road shocks. Leaf springs were used in early vehicles to provide the shock absorbing features, and through the years these have evolved into the conventional multileaf spring bundle which approaches the theoretical uniform spring rate of a parabolic longitudinal section spring. These multileaf springs are undesirably heavy, the brackets required to support the leaves and provide sidesway resistence add considerable weight to the assembly and the large number of leaves required inherently result in a considerable amount of friction between leaves which affects spring deflection by increasing the spring rate. This is particularly apparent during the spring deflection reversals.

In such prior art multileaf springs, it is generally impossible to obtain a uniform spring rate. A uniform rate spring is one wherein the same incremental variation in load produces the same incremental spring deflection. There has been constant industrial research in an attempt to overcome problems relating to uniform spring rate as well as reduction of interleaf friction, but such has not succeeded in eliminating these problems. Parabolic tapered leaf springs have been proposed but have not been satisfactory. Part of this invention includes the discovery that non-uniform spring rates in prior tapered parabolic leaves were unavoidable because it was not appreciated that the varying longitudinal thickness should be held to sufficiently close tolerances.

This invention contemplates a long spring leaf with a rolled approximately parabolic longitudinal contour taper along which the tolerance of desired gauge thickness at any location is held to within 0.005 inch. By so forming the long tapered leaf it has been found that substantially uniform rate leaf springs can be reproducibly obtained. This new rolled long taper leaf is formed with one side flat.

The primary object of this invention resides in providing a long rolled tapered spring which is flat on one side and has a substantially parabolic longitudinal shape on its other side tapering from at or near its center to its thinner ends. This substantially parabolic shape can be a constant essentially parabolic curve, or it can be formed by several adjacent constant straight taper sections of different inclinations which effectively result in a substantially parabolic longitudinal section.

Further novel features and other objects of this invention will become apparent from the following detailed description and the appended claims taken in conjunction with the accompanying drawings in which:

FIGURE 1 is a side elevation showing a preferred embodiment of the leaf spring of this invention with parabolic tapered end sections;

FIGURE 2 is a bottom plan view of the tapered leaf of FIGURE 1;

FIGURE 3 is a side elevation of a straight taper spring leaf according to the invention, the spring thickness being enlarged to accentuate the different inclinations of the straight taper portions;

FIGURE 4 is a bottom plan view of the spring leaf of FIGURE 3;

FIGURE 5 is a diagrammatic view of the spring leaf of FIGURE 3, the actual length being greatly reduced to a better visual representation of the approximate parabolic contour; and FIGURE 6 is a side elevation showing a further embodiment of the invention.

Referring to FIGURES 1 and 2 the spring 6 of the preferred embodiment of the invention consists essentially of a single taper rolled leaf 7 formed from a steel blank.

Spring leaf 7 has a central position 8 of maximum, and preferably, uniform cross section which may be provided with means such as a bolt hole 9 for attachment to a vehicle axle.

Leaf 7 is of constant width and constant lateral cross section as shown in FIGURE 2, and one side 10 is straight and flat as shown in FIGURE 1.

Leaf 7 is uniformly and identically decreasingly tapered longitudinally from central portion 8 to its thinner ends. The tapered surfaces are indicated at 11 and 12, and the contour of these tapered surfaces longitudinally is parabolic and designed to produce an optimum absolute spring rate depending on the vehicle and the service.

The parabolic surfaces 11 and 12 are formed by roll tapering in a suitable machine wherein the cross sectional thickness tolerances along the leaf with respect to a theoretical parabolic curve calculated for producing a desired spring rate may be accurately maintained within acceptable limits here, in the case of a vehicle spring leaf, within plus or minus 0.005 inch.

The spring ends may be suitably supported in the vehicle frame as by shackles, eyes, notches, cradles, wear pads and like conventional structures.

FIGURES 3 and 4 show an embodiment of the invention wherein the taper longitudinally of the leaf is provided by adjacent straight taper sections of different inclination.

Spring leaf 14 is of uniform width all the way between opposite ends 15 and 17, and it has a uniformly thick central portion 22 formed with an axle attachment bolt hole 20. One side 36 of the leaf is flat and straight. At each side of the central portion 22, which is the thickest part of the leaf, there are two successive straight taper rolled sections of different inclination.

Opening 20 extends entirely through uniformly thick gauge portion 22 of the taper rolled leaf 14, the portion 22 in an actual construction extending one inch toward each end from the opening 20. For purposes of convenience, portion 22 will hereinafter be termed the center portion. The taper sections extend from center portion 22 to each end of leaf 14, and each section in the actual construction has two constant taper portions. One machine rolled constant taper 24 extends from center portion 22 and adjoins a second machine rolled constant taper 26 which extends on to left end 15 of the leaf in FIGURE 3. On the right hand part of spring leaf 14, a first machine rolled constant taper 28 extends from center portion 22 and adjoins a second machine rolled constant taper 30 which extends to the end 17 of the leaf.

In the aforementioned actual construction as exemplified by FIGURES 3 and 4, taper 24 extends for 9 inches along leaf 14 at 0 degree 49 minutes included angle, which gives a taper of 0.0142 inch per inch along leaf 14. Taper 26 extends for 16 inches along the leaf 14 at 1 degree 12 minutes included angle, which gives a taper of 0.021 inch per inch. Taper 28 extends for 9 inches along leaf 14 at 0 degree 43 minutes included angle, which gives a taper of 0.0127 inch per inch. Taper 30 extends for 18 inches along the leaf 14 at 1 degree 7 minutes included angle, which gives a taper of 0.0195 inch per inch. Machine rolled tapers 24, 26, 28 and 30 on the leaf 14 must be held to plus or minus 0.005 inch variation in gauge thickness, to uniformly reproduce a desired spring rate within desired acceptable limits.

These accurately controlled tapers on the leaf 14 of FIGURES 3 and 4 supply a parabolic spring approximation for the single leaf spring which furnishes substantially the same vibration frequency and ride as a longer and heavier parabolic multi-leaf spring bundle. Spring 14 enables a ride closely approaching the ride given by coil and/or torsion springs and accomplishes this with a light weight spring using less metal.

By using the single taper leaf spring of the invention as a vehicle spring, total spring weight is reduced materially as compared to that of conventional multi-leaf springs which often had a spring pack of six or seven leaves, and increases resistance to sidesway as well as drive torque from a spring suspended driving axle. Interleaf friction is eliminated.

From the foregoing it is apparent that I have provided a new and improved leaf spring consisting of only one accurately formed spring leaf with approximate parabolic longitudinal contours from a thick gauge portion to each end. The invention provides a spring in which interleaf friction is entirely eliminated, and the leaf spring has a more uniform spring rate throughout the range of spring deflection than conventional spring stacks.

FIGURE 6 illustrates a further embodiment of the invention that has been successfully reduced to practice. It consists of a single taper leaf spring 31 having a flat straight lower surface 32 that is of uniform width from end to end, like the springs of FIGURES 2 and 4.

At opposite ends the spring 31 is formed to provide eyes 33 that are pivotally attached at 34 to the upper ends of shackle links 35 which in turn are pivoted at 36 upon frame supported brackets 37.

Spring leaf 31 has a central longitudinal section 38 of maximum uniform thickness wherein the upper surface 39 is flat and parallel to lower surface 32. One or more apertures 41 are provided in the central part of leaf section 38 for axle attachment brackets (not shown), it being understood that in use the central portion 38 of the spring leaf is rigidly secured to a transverse axle underlying the vehicle frame. Two spring leafs are used on at each side of the vehicle extending longitudinally of the vehicle between associated frame brackets 37 and centrally fixed to the axle outer ends.

Uniformly thick spring seat attachment section 38 is flanked on opposite sides by identically tapered decreasing thickness sections 42 of minor length having straight flat upper surfaces 43 inclined from the ends of surface 39.

Extending from the ends of leaf sections 42 toward the end eyes 33 are identically tapered decreasing thickness sections 44 of major length having straight flat inclined upper surfaces 45. Surfaces 45 preferably extend away from the outer ends of surfaces 43 at a slightly smaller angle of inclination relative to straight side surface 32 than that of surfaces 43, so that the taper sections 42 effectively provide a stress equalizing transition section between the axle attachment central section and the major tapered sections 44 which comprise the effective working portions of the spring.

The spring leaf is again of uniform thickness in its outer end sections 46, and the eyes 33 are preferably curved extensions of these end sections 46. The upper surfaces 47 of these end sections are flat, straight and parallel to bottom surface 32.

The spring of this invention, when under normal load installed in a vehicle extends as shown in FIGURE 6 with bottom surface 32 substantially horizontal. Under this condition the transverse centerlines 48 of the end eyes lie in a plane indicated at 49 that extends longitudinally through the metal of the spring leaf intermediate the flat bottom surface 32 and the combination flat and tapered upper surfaces.

Surfaces 43 and 47 are preferably formed in a roll taper machine, as in the other embodiments, wherein the changing transverse thickness of the leaf is accurately held within tolerances of plus and minus 0.005 inch.

The particular spring 31 shown in FIGURE 6 is 61 inches long between eye centers, and is three inches wide. It is integrally formed of SAE 4160 steel. Surfaces 43 and 45 are formed in a hot rolling operation and the entire upper surface of the spring leaf, which is the tension side in this particular spring, is shot peened to relieve and distribute surface stresses.

The tapers at 43 and 45 are quite gradual, in this particular spring being 0.025 inch per inch and 0.0236 inch per inch respectively so that their junctures smoothly join with each other and the flat straight surfaces 39 and 47 without sharp edges where stress concentrations might occur, and the shot peening further smooths these junctures and eliminates the chances of stress concentrations there.

The illustrated spring leaf 31 has a central section 38 that is eight inches long, each tapered transition section 42 is one inch long, and each major tapered section 44 is nineteen inches long. The spring eyes are formed with an inner diameter of about 1.780 inches. The leaf has a maximum uniform thickness of 0.85 inch at central section 38, and a minimum uniform thickness of 0.40 inch at the end sections 46.

Spring 31 is of particular utility in light weight vehicles such as passenger vehicles. It provides a spring of minimum weight, and in passenger cars it results in a better ride because of the lower percentage of unsprung weight and hysteresis. The service life is longer with less maintenance. It lends itself to automatic production with accurate highly uniform quality control.

The straight taper of surfaces 47 is chosen as in FIGURES 3 and 4 to approximate a theoretical parabolic contour providing a desired spring rate.

The invention may be embodied in other specific forms without departing from the spirit or essential characteristics thereof. The present embodiments are therefore to be considered of the invention being indicated by the appended claims rather than by the foregoing description, and all changes which come within the meaning and range of equivalency of the claims are therefore intended to be embraced therein.

What is to be claimed and desired to be secured by Letters Patent is:

1. A vehicle leaf spring consisting entirely of a rolled steel single spring leaf that is of constant width from end to end has a generally central portion of minor length providing means for attachment to axle structure or the like, and is of continually decreasing thickness tapering from said central portion to both of said ends, said spring leaf being of constant thickness in lateral cross-section between its longitudinal edges at all points along its length and having one side formed with surfaces of substantially parabolic contour longitudinally from said central portion to said ends, and said surfaces being formed by rolling with a thickness tolerance at all longitudinal locations along the tapered portions of plus or minus 0.005 inch from a theoretical desired substantially parabolic contour.

2. The leaf spring defined in claim 1 wherein said contoured surfaces on one side are truly parabolic.

3. The leaf spring defined in claim 1 wherein said contoured surfaces are defined by successive differently inclined flat sections.

4. The leaf spring defined in claim 1, where the surface of the other side of said leaf is straight and flat.

5. A vehicle leaf spring consisting entirely of a rolled steel single spring leaf that is of constant width from end to end and of constant thickness in lateral cross-section between its longitudinal edges at all points along its length and has an axle or like attachment portion of maximum thickness, said spring leaf being of constantly decreasing thickness from said attachment portion to an end, and one side of said spring leaf being straight and flat and the other side being of substantially parabolic contour rolled with a thickness tolerance of plus or minus 0.005 inch with respect to a theoretical desired substantially parabolic contour.

6. In a single leaf spring consisting essentially of a single length of spring metal having a relatively short central spring seat section of uniform thickness adapted to be secured to one relatively movable vehicle part and oppositely extending accurately formed considerably longer tapered sections that extend away from said spring seat section to terminals for attachment to another relatively movable vehicle part, the improvement which comprises the provision of a transition tapered section of minor length between each end of said central section and the associated long tapered section, said transition tapered sections being shorter and of slightly greater inclination than said longer sections.

7. A single taper leaf spring which comprises a single length of spring metal having a central section of maximum uniform thickness for attachment to one vehicle portion and opposite end sections of minimum uniform thickness terminating in means for attachment to a relatively movable vehicle portion, one side of said spring being straight and flat between said end portions, and the other side having two successive contour surfaces extending between and joining each opposite side of said central section and the adjacent end section, said successive surfaces being flat and longitudinally inclined at different angles, and said contour surfaces being formed with the changing transverse thickness of the leaf held within tolerances of plus or minus 0.005 inch.

8. The single taper leaf spring defined in claim 7, wherein the two inclined flat surfaces immediately the opposite ends of said central section are of minor length and greater inclination than the other inclined flat surfaces, whereby to serve as transition taper sections.

9. A single leaf vehicle spring consisting essentially of a single length of spring metal having a relatively short uniformly thick spring seat section adapted to be secured to an axle and oppositely extending accurately formed considerably longer tapered sections disposed between said spring seat section and terminals for attachment to the vehicle frame, said spring having one surface straight and flat between said terminals and its opposite tapered section surfaces gradually inclined away from maximum thickness regions adjacent opposite ends of said spring seat section toward said terminals, said tapered surfaces being formed with a thickness tolerance at all longitudinal locations along said tapered sections of plus or minus 0.005 inch with respect to a theoretical desired substantially parabolic contour.

References Cited in the file of this patent

UNITED STATES PATENTS

| | | |
|---|---|---|
| 598,516 | Hess | Feb. 8, 1898 |
| 2,580,975 | Tea | Jan. 1, 1952 |
| 2,608,752 | Schilling | Sept. 2, 1952 |
| 2,876,891 | Long et al. | Mar. 10, 1959 |

OTHER REFERENCES

Manual on Design and Application of Leaf Springs, S.A.E., War Engineering Board, November 1944.